United States Patent [19]

Haas et al.

[11] Patent Number: 5,178,677
[45] Date of Patent: Jan. 12, 1993

[54] COATING APPARATUS FOR APPLYING A COATING COMPOSITION TO SUBSTANTIALLY FLAT BAKED PIECES, PARTICULARLY COOKIES OR THE LIKE

[75] Inventors: Franz Haas, Leobendorf; Craig Ellefson, Vienna, both of Austria

[73] Assignee: Franz Haas Waffelmaschinen Industriegesellschaft m.b.H., Vienna, Austria

[21] Appl. No.: 711,190

[22] Filed: Jun. 5, 1991

[30] Foreign Application Priority Data

Jun. 7, 1990 [AT] Austria .................. 1242/90

[51] Int. Cl.⁵ .................. B05C 5/00; A23P 1/08
[52] U.S. Cl. .................. 118/25; 118/24; 118/324; 222/55; 222/63; 222/342; 222/345
[58] Field of Search .................. 118/692, 17, 24, 28, 118/29, 324, 25; 222/55, 63, 342, 345, 361, 362, 367, 368

[56] References Cited

U.S. PATENT DOCUMENTS

| 544,966 | 9/1985 | Davis | 222/342 |
| 2,217,020 | 10/1940 | Jurgens | 118/25 |
| 2,363,961 | 11/1944 | Hart | 222/342 |
| 2,485,226 | 10/1949 | Weeden | 118/24 |
| 3,926,146 | 12/1975 | Breyer et al. | 118/24 |
| 4,830,219 | 5/1989 | Siemann | 222/55 |
| 4,844,296 | 7/1989 | Hayashi et al. | 222/55 |

Primary Examiner—W. Gary Jones
Assistant Examiner—T. Jeffrey Burns
Attorney, Agent, or Firm—Kurt Kelman

[57] ABSTRACT

In a coating apparatus for applying a coating composition to substantially flat baked pieces, particularly cookies or the like, which apparatus includes a supply container (15) and a metering device (14) succeeding that container, it is proposed to provide between the supply container (15) and the metering device (14) a substantially horizontal screw conveyor (13), which serves to transpsort the coating composition to the metering device (14) and which at its discharge end opens into the metering device (14), which includes a cylindrical coating head (14) having a substantially horizontal longitudinal axis. The metering body of the coating head (14) consists of a cylindrical drum (21), which rotates about the longitudinal axis of the coating head (14). That drum (21) is provided with radial discharge nozzle passages (28). A pressure sensor (36) for controlling the velocity of conveyance of the screw conveyor (13) is provided in a stationary part of the coating head (14).

1 Claim, 3 Drawing Sheets

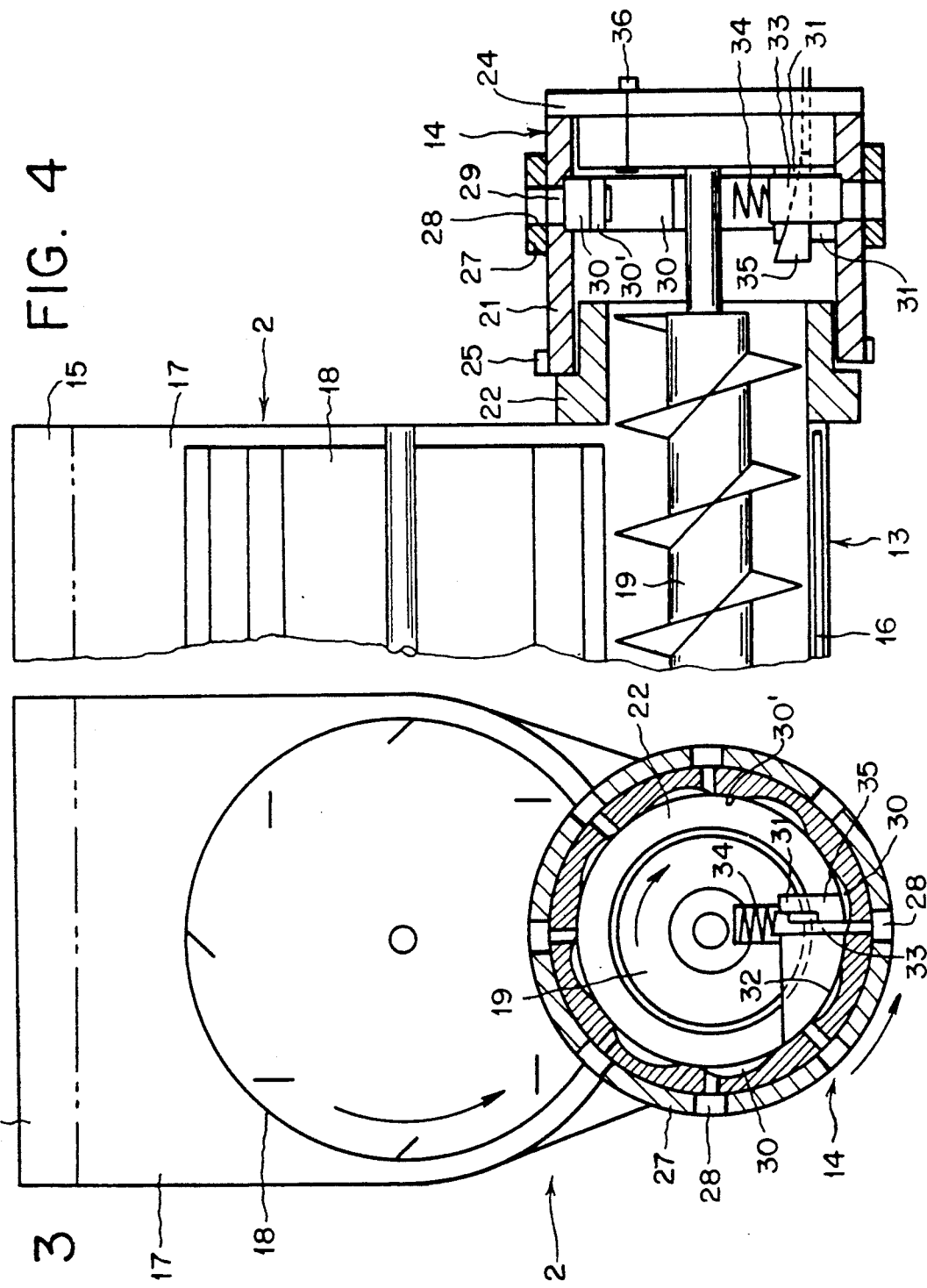

COATING APPARATUS FOR APPLYING A COATING COMPOSITION TO SUBSTANTIALLY FLAT BAKED PIECES, PARTICULARLY COOKIES OR THE LIKE

BACKGROUND OF THE INVENTION

1. Field of the Invention

This invention relates to a coating apparatus for applying a coating composition to substantially flat baked pieces, particularly cookies or the like, comprising a storage container and a metering device, which succeeds said container and comprises a rotating metering body, which contains a plurality of metering pockets, which open outwardly through discharge nozzle passages, and a non-rotatable scraping blade, which is provided at the coating location and is adapted to be resiliently urged against the surface of the metering body, which in said surface is formed with said metering pockets. Said scraping blade forces the coating composition in an exactly metered quantity out of a metering pocket through the succeeding discharge nozzle passage as said pocket moves past said blade.

2. Description of the Prior Art

In a known apparatus of that kind the rotating metering body provided with the metering pockets consists of a flat disk, which constitutes the flat bottom of an upright cylindrical container. The baked pieces which are to be coated, such as cookies, are transported below the metering disk in a direction which is tangential with respect to the axis of rotation of the metering disk and as the transportation of the cookie to the coating location is continued past said location a predetermined quantity of the coating composition is forced by the scraping blade out of a metering pocket through the discharge nozzle passage onto the top surface of the cookie. That known apparatus has the disadvantages that the entire weight of the coating composition contained in the supply container must be taken up by the metering disk and that that coating composition is continuously agitated and mixed by the continuously rotating metering disk. The intensity of that mixing action will increase as the quantity of coating composition in the supply container decreases. With some creams this will result in a change of the consistency of the coating as it is applied so that the consistency of the cream coating on the cookies will vary in dependence on the level of the coating composition in the supply container. A further disadvantage resides in that the coating composition in the supply container is moved to the metering disk only by gravity and this is opposed by the agitation which is imparted to the coating composition by the rotating metering disk. For this reason the known coating apparatus can be used only for creams having a viscosity within a very narrow range.

SUMMARY OF THE INVENTION

It is an object of the invention to eliminate said disadvantages.

This is accomplished in accordance with the invention in that a substantially horizontal screw conveyor for transporting the coating composition to the metering device is provided between the supply container and the metering device and at its delivery end opens into the metering device, which comprises a coating head having a substantially horizontal longitudinal axis, the metering body consists of a drum, which rotates about the longitudinal axis of the coating head and is provided with radial discharge nozzle passages, and a stationary part of the coating head is provided with a pressure sensor for controlling the velocity at which the coating composition is conveyed by the screw conveyor. That design ensures that the pressure of the coating composition in the coating head will be independent of the level of the coating composition in the supply container so that a uniform coating will be formed on the baked pieces. Owing to the provision of the screw conveyor the apparatus can be used in a wider field of application to apply stiffer coating compositions and coating compositions having a higher viscosity.

BRIEF DESCRIPTION OF THE PREFERRED EMBODIMENTS

FIG. 3 is a transverse sectional view showing another embodiment of the coating apparatus.

FIG. 4 is a longitudinal sectional view showing the coating apparatus of FIG. 3.

DETAILED DESCRIPTION OF THE PREFERRED EMBODIMENTS

Figure 1:
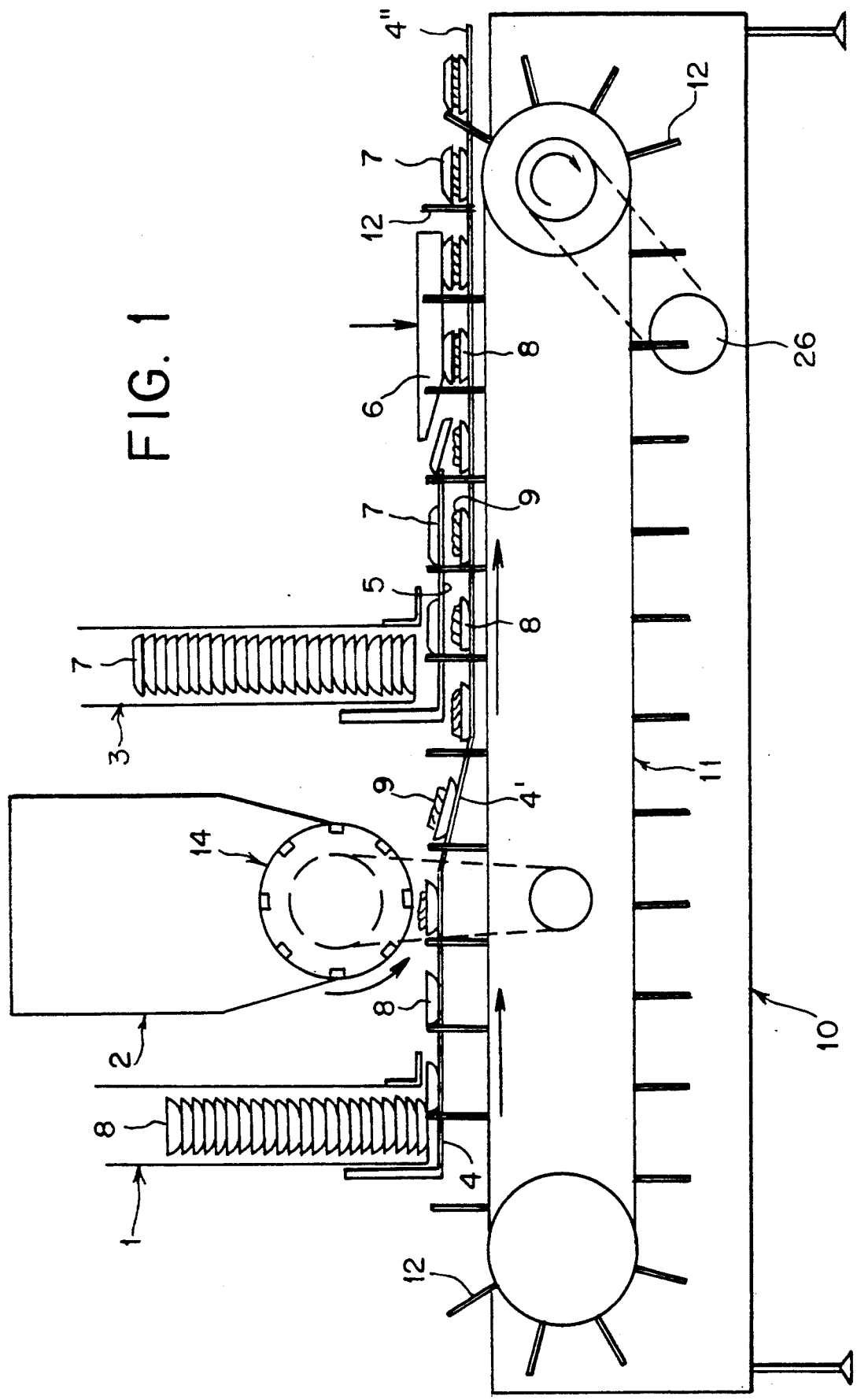
FIG. 1 is a side elevation showing an apparatus for making double or sandwich cookies, which apparatus is provided with a coating apparatus in accordance with a first embodiment of the invention.

The invention will now be explained more in detail with reference to preferred illustrative embodiments shown in the drawings.

Figure 2:
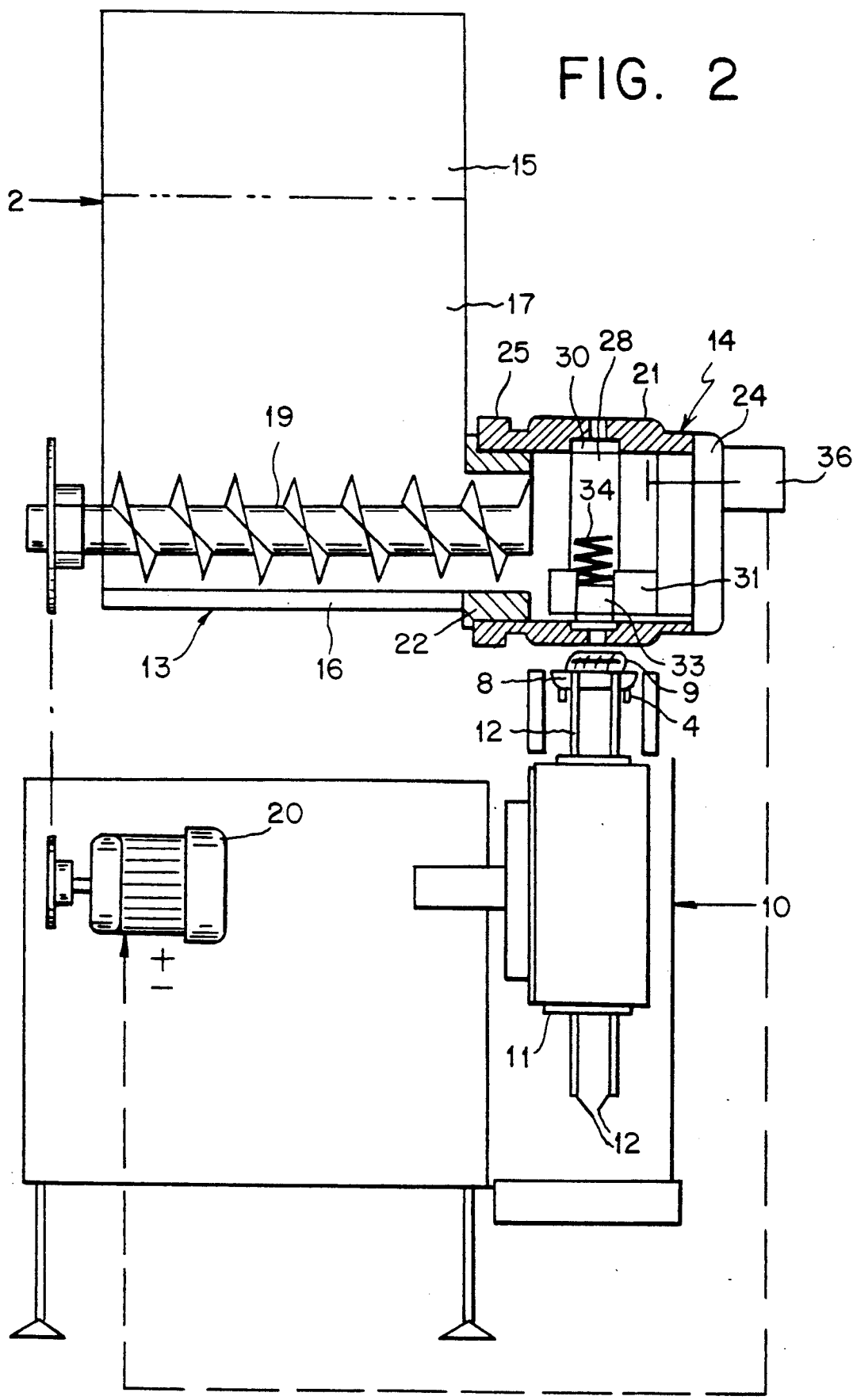
FIG. 2 is an end elevation showing the apparatus of FIG. 1.

FIGS. 1 and 2 show an apparatus for producing filled cookies. That apparatus comprises a first cookie magazine 1, a coating apparatus 2, which succeeds the magazine 1, a second cookie magazine 3, which succeeds the coating apparatus 2, a first guiding surface 4, which is constituted by parallel guide rods for supporting the cookies taken from the first cookie magazine 1, a second guiding surface 5, which is constituted by parallel guide rods for supporting the cookies taken from the second cookie magazine 3, a pressure-applying device 6 for urging each upper cookie 7 onto the coating 9 applied to a lower cookie 8, and a horizontal conveyor 10, which comprises pairs of pins 12, which are mounted on an endless conveyor belt 11 and protrude between adjacent guide rods through the first guiding surface 4 and through the second guide rods 5 and push the cookies ahead on the guiding surfaces 4, 5. In the direction of conveyance the pairs of pins 12 are spaced such a distance apart that each cookie will fit between two consecutive pairs of pins 12. By the pairs of pins 12 the lower cookies 8 are pushed out of the first cookie magazine 1 and transported on the guiding surface 4 under the coating apparatus and past the same and on a sloping down ramp 4' in the guiding surface 4 and subsequently on the lower portion 4" of the guiding surface 4 under the second guiding surface 5, which extends under the second cookie magazine 3. By the pairs of pins 12 the upper cookies 7 are pushed out of the second cookie magazine 3 and on the second guiding surface 5 and are placed on the coating 9 which has been applied to the lower cookies 8.

A coating apparatus 2 in accordance with the invention is provided above the upper guiding surface 5 and comprises a screw conveyor 13, which is succeeded by a coating head 14 and on which a supply container 15 has been mounted (FIG. 2). The supply container 15 is surrounded by a water jacket 16 for controlling the temperature of the coating composition 17. The conveyor screw 19 of the screw conveyor 13 is driven by a first motor 20. The coating head 14 is provided at the discharge end of the screw conveyor 13 and comprises a rotating outer cylindrical drum 21, which is rotatably mounted on one side in the stationary head 22 at the delivery end of the screw conveyor 13 and on the other side in a stationary end disk 24 of the coating head 14 and carries a gear 25 adapted to be driven by the drive motor 26 of the horizontal conveyor 10. Radial discharge nozzle passages 28 are provided in the shell of the drum 21 and are regularly spaced apart around the periphery of the drum 21 and each of said nozzle passages opens inside of the drum 21 in a separate pocketlike radial recess 30, which is formed in the inside surface of the drum and extends along the inside periphery of the drum 21. Said recesses 30 are regularly spaced apart on the inside peripheral surface of the drum and are separated from each other by lands.

The coating head 14 also comprises a foot 31, which is secured to the inside surface of the stationary end disk 24 and protrudes into the interior of the coating head 14 beyond the path of the recesses 30. Said foot is disposed in the lower half of the coating head 14 over the coating location and has a cylindrical surface portion which cooperates with the inside surface of the drum and covers at least one of the recesses 30 at a time. That foot 31 is formed with a radial slot for receiving a radially displaceable scraping blade 33, which is adapted to enter each of the recesses 30. That blade 33 is urged radially outwardly by a spring 34 until an engaging surface of the blade engages an adjustable stop, which determines the depth of penetration of the blade 33 into the recesses 30. The means 20 for driving the conveyor screw 19 are controlled by a pressure sensor 36, which is provided in the end disk 24 and controls the speed of the motor 20 for driving the conveyor screw 19.

FIGS. 3 and 4 show a different embodiment of the coating apparatus, in which a supply container 15 is mounted on a screw conveyor 13, which is succeeded by a coating head 14. The supply container 15 is surrounded by a water jacket 16 for controlling the temperature of the coating composition 17 and contains a paddle wheel 18 for forcing the coating composition 17 down to the screw conveyor 13. The paddle wheel 18 and the conveyor screw 19, which is included in the screw conveyor 13, are driven by a first motor, not shown.

A coating head 14 is provided at the discharge end of the screw conveyor 13 and comprises a rotating outer cylindrical drum 21, which is rotatably mounted on one side in the stationary head 22 at the discharge end of the screw conveyor 13 and on the other side in a stationary end disk 24 of the coating head 14 and carries a gear 25, which is adapted to be driven by a second motor, not shown. A ring 27 is coaxially mounted on the outside surface of the drum 21 and contains discharge nozzle passages 28, which are regularly spaced around the periphery and communicate with the outer ends of through passages 29 formed in the drum 21. On the inside of the drum each through passage 29 opens into a separate pocketlike radial recess 30, which is formed in the inside surface of the drum 21 and extends along the inside peripheral surface of the drum 21. Said recesses 30 are regularly spaced apart on the inside peripheral surface of the drum and are separated by lands 30', which have inside surfaces constituted by the cylindrical inside surface of the drum.

The coating head 14 is also provided with a foot 31, which is secured to the inside surface of the stationary end disk 24 and protrudes into the interior of the coating head 14 beyond the path of the recesses 30. The foot 31 is disposed in the lower half of the coating head 14 over the coating location and comprises a cylindrical surface portion 32, which cooperates with the inside surface of the drum and covers at least one of the recesses 30. That foot 31 is formed with a radial slot for receiving a radially displaceable scraping blade 33, which is adapted to enter each of the recesses 30. That blade 33 is urged radially outwardly by a spring 34 until an engaging surface of the blade engages an adjustable stop 35, which determines the depth of penetration of the blade 33 into the recesses 30.

For the control of the means 20 for driving the conveyor screw 19, a pressure sensor 36 is provided in the stationary end disk 24 of the coating head and controls the speed of the motor for driving the conveyor screw 19.

In the operation of the apparatus the coating composition contained in the supply container 15 is moved downwardly to the conveyor screw 13 by gravity or by the paddle wheel 18 and is forced by the conveyor screw 13 into the coating head 14. The outer drum 21 of the coating head 14 revolves at a peripheral velocity which is equal to the velocity at which the cookies are conveyed to the coating head 14 at the coating location. The recesses 30 of the rotating drum 21 move past the stationary foot 31 and past the blade 33, which is provided at the coating location and is only vertically movable. As the spring-loaded blade 33 follows the radially outer contour of each recess 30, the coating composition which is confined in each recess 30 between the foot 31 and the drum 21 is forced by the blade 33 in an amount depending on the adjustment of the blade out of the recess 30 through the discharge nozzle passage 28.

The quantity of coating composition to be discharged at a time can exactly be adjusted by means of the stop 35. The provision of the pressure sensor 36 for controlling the drive for the conveyor screw 19 permits an automatic operation of the coating apparatus while the cream contained in the coating head is subjected to a constant pressure.

We claim:

1. An apparatus for applying a coating composition to substantially flat baked pieces at a predetermined coating location, which comprises the combination of
   (a) a supply container holding the coating composition,
   (b) a screw conveyor arranged to convey the coating composition from an input end at the supply container to an output end, the screw conveyor comprising
      (1) an adjustable conveyor drive, and
   (c) a coating head arranged at the predetermined coating location to receive the coating composition from the output end of the screw conveyor and to discharge metered portions of the coating composition onto respective ones of the baked pieces conveyed in succession under the coating head, the coating head comprising
      (1) a cylindrical coating drum rotatable about a substantially horizontal axis and having a shell whose interior surface defines an interior chamber receiving the coating composition from the screw conveyor output end, the interior shell surface defining metering pockets uniformly distributed about the periphery of the interior shell surface and the drum having coating composition discharge nozzles communicating with the metering pockets for applying the coating composition from the metering pockets to the respective baked pieces, (2) a scraping blade arranged in the interior chamber at the nadir of the coating drum and spring-biased against the interior shell surface into respective ones of the metering pockets as the rotating coating drum moves successive metering pockets past the scraping blade whereby the scraping blade applies the metered coating composition portions through the discharge nozzles to the baked pieces, (3) adjustable stop means for engaging the spring-biased scraping blade to determine the depth of penetration of the scraping blade into the metering pockets, (4) a stationary part adjacent the coating drum, and (5) a sensor mounted on the stationary part and sensing the pressure of the coating composition in the interior chamber, the adjustable conveyor drive being controlled in response to the sensed pressure.

* * * * *